No. 792,069. Patented June 13, 1905.

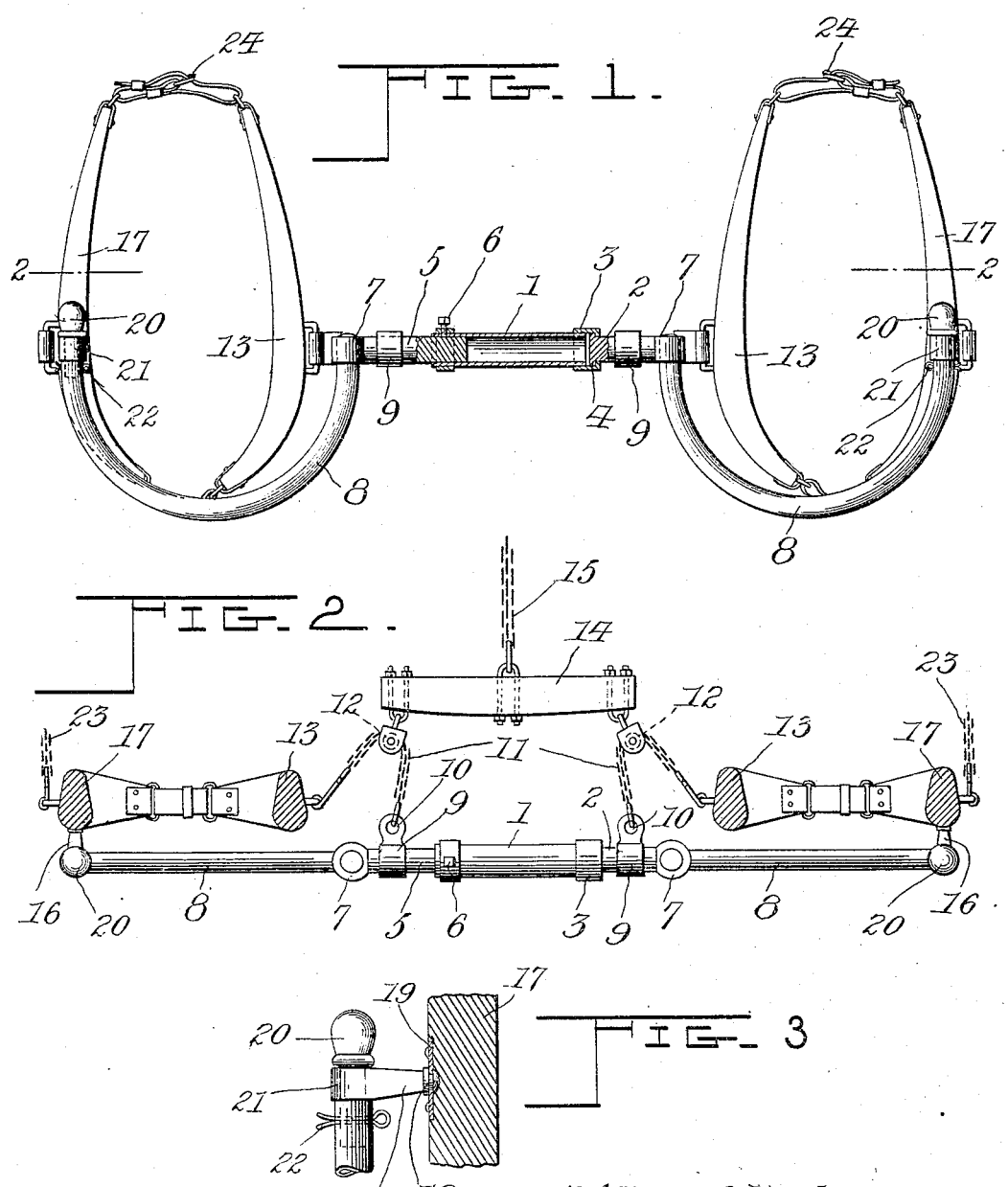

UNITED STATES PATENT OFFICE.

WALLACE G. PARKER, OF KENTVILLE, CANADA.

HARNESS-YOKE.

SPECIFICATION forming part of Letters Patent No. 792,069, dated June 13, 1905.

Application filed November 20, 1903. Serial No. 181,940.

*To all whom it may concern:*

Be it known that I, WALLACE G. PARKER, a subject of the King of Great Britain, residing at Kentville, Kings county, Province of Nova Scotia, Canada, have invented certain new and useful Improvements in Harness-Yokes; and I do hereby declare that the following is a full, clear, and exact description of the invention, such as will enable others skilled in the art to which it appertains to make and use the same.

My invention relates to harness, and especially to the draft mechanism used in connection with heavy work, such as plowing.

More particularly, the invention concerns itself with the construction of a yoke adapted to be used when two horses or other animals are employed together to draw the same plow.

The object of the invention is to provide a yoke of the kind suggested which is of simple construction, but which at the same time will securely connect the collars of the animals, while allowing considerable freedom of movement between the connecting parts.

In the invention it has also been my object to provide such an arrangement between the animals as will operate to equalize the work between them.

The invention contemplates the employment of a cross-bar, which is disposed between the two animals near their collars, and to the extremities of this cross-bar bows are attached, which pass around and under the animals' necks. These bows are attached to the hames, and the hames are also attached on their inner side to the cross-bar by improved means. Throughout the entire construction arrangement is made for allowing great freedom of movement between all the attached parts.

The invention consists in the construction and combination of parts to be more fully described hereinafter and definitely set forth in the claims.

In the drawings, which fully illustrate my invention, Figure 1 is substantially a front elevation, the cross-bar referred to above being shown in section. Fig. 2 is a horizontal section taken substantially on the line 2 2 of Fig. 1. Fig. 3 is a side elevation showing a portion of the outer extremity of one of the bows referred to above in connection with the adjacent portion of the hame, the said hame being shown in section.

Throughout the drawings and specification the same numerals of reference denote like parts.

Referring more particularly to the parts, 1 represents a central bar or cross-arm, which is preferably formed of a tubular member, such as a piece of pipe. At one extremity of this pipe a swivel-head 2 is attached by means of a coupling-nut 3, which receives a shoulder or collar 4, formed at the extremity of the swivel-head, as shown. At the opposite extremity of the cross-arm 1 a fixed head 5 is attached, preferably by means of a set-screw 6, as shown, which permits adjustment of the length of the cross-arm within certain limits. These heads 2 and 5 terminate in enlarged eyes 7, in which bows 8 are rigidly attached, which bows are preferably of substantially the form shown, each being bent into the general shape of a semicircle. These bows are preferably formed of pipe and should be permanently attached in some manner, as by welding, to their seats in said eyes 7.

Upon the heads 2 and 5 collars 9 are rigidly attached, the same being formed rearwardly with eyes 10 to receive equalizer-chains 11, which chains pass back over pulleys 12 and then forwardly, attaching to the inner hame members 13. The shackles of the pulleys 12 attach in any suitable manner to a swingletree 14, at the center of which a draft-chain 15 is attached, which draft-chain extends rearwardly to the plow.

The outer extremities of the bows 8, which are located at substantially the same height as the cross-arm 1, attach to studs 16, carried by the forward faces of the outer hame members 17, the said studs making a swivel connection 18 with the hame members through the medium of plates 19, as shown. The connection at these points also includes pins 20, which have enlarged heads and shanks which pass through eyes 21 at the extremities of the studs, the said pins being secured in place by means of split pins 22 or similar means. At the outer sides of the yoke suitable draft-chains 23 are attached, the same being secured to the outer sides of the outer hame members, as shown.

It should be understood that after the animals have received their collars and have been placed together in the proper relative position the yoke constituting the present invention would be applied, the hames being attached to the collars by means of fasteners or straps 24, connecting the upper extremities of the hame members, as shown. It will readily appear that the construction described permits a great freedom of movement of the animals drawing the plow, and at the same time the arrangement for connecting the inner hame members with the draft-chain 15 affords means for equalizing or distributing the work between the two animals.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. A yoke comprising a cross-arm, bows rigidly attached to the extremities thereof, means for varying the length of the cross-arm, said cross-arm having a swivel connection therein between said bows, in combination with hames attaching to the bows.

2. In combination, a cross-arm having a swivel-joint, forming a part thereof, bows attached to the extremities of said cross-arm, hames, and means for connecting said hames respectively with said bows and said cross-arm.

3. In combination, a cross-arm, bows attached to the extremities thereof, hames, swivel-sockets on said hames, substantially horizontal extensions of said bows engaging said sockets, chains connecting said hames with said cross-arm, and draft means attached to said chains.

4. In combination, a cross-arm having a swivel connection therein and adapted to be placed between the necks of two draft-animals, bows attached to the extremities of said cross-arm and adapted to pass under the necks of said draft-animals, hames, swiveled connections between the draft members of said hames, and approximately horizontal extensions of said bows, a whiffletree disposed behind said cross-arm, and means for connecting said whiffletree with said cross-arm and the inner member of said hames.

5. In combination, a cross-arm adapted to be disposed between the necks of two draft-animals, said cross-arm having a swivel connection therein, bows attached to the extremities of said cross-arm and adapted to pass under the necks of said draft-animals, hames, studs attached to the outer members of said hames, means for pivotally attaching said studs to said bows, a whiffletree disposed behind said cross-arm, chains connecting said cross-arm with the inner members of said hames, said chains attaching to said whiffletree.

6. In combination, a cross-arm adapted to be placed between the necks of two draft-animals, a swiveled head attached at one extremity of said cross-arm, a second head adjustably attached at the opposite extremity of said cross-arm, bows attached to said heads adapted to pass under the necks of said draft-animals, hames, rotatable studs carried by the outer members of said hames, means for loosely connecting said studs with said bows, a whiffletree behind said cross-arm, pulleys attached near the extremities thereof, and chains passing over said pulleys and having their extremities attached to said cross-arm, and to the inner members of said hames.

In witness whereof I have hereunto set my hand in the presence of two witnesses.

WALLACE G. PARKER.

Witnesses:
C. E. HARRIS,
FRANK RAND.